No. 724,802. PATENTED APR. 7, 1903.
A. C. CAMPBELL.
COMBINED CUPBOARD AND REFRIGERATOR.
APPLICATION FILED JULY 12, 1902.
NO MODEL. 2 SHEETS—SHEET 1.
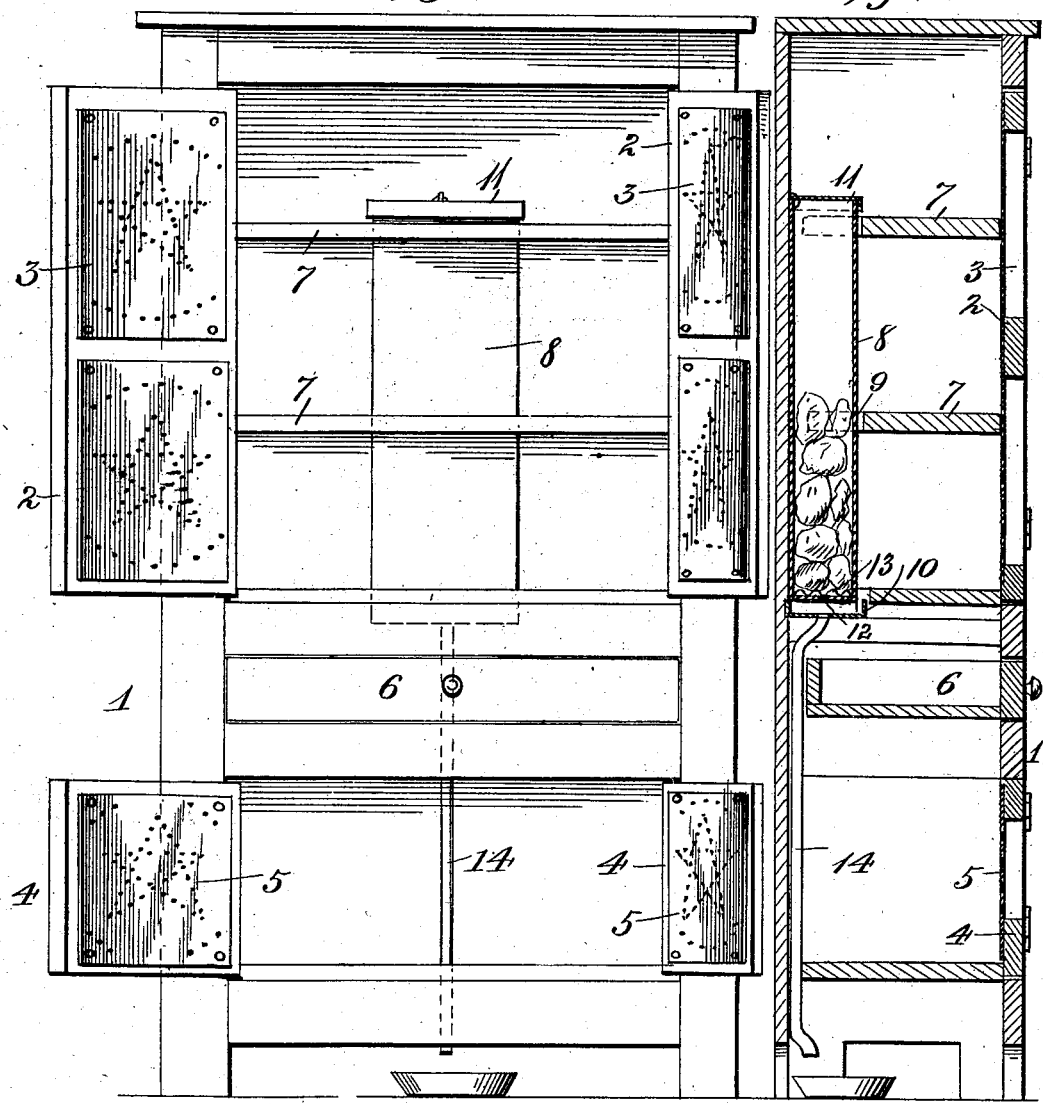
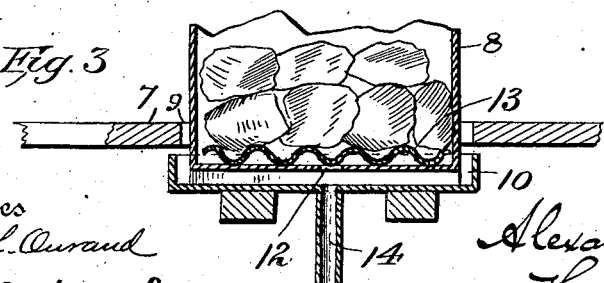
Witnesses
Franck L. Durand
Chas. F. Hatch
Inventor
Alexander C. Campbell
by Hensey & Lough
Attorneys

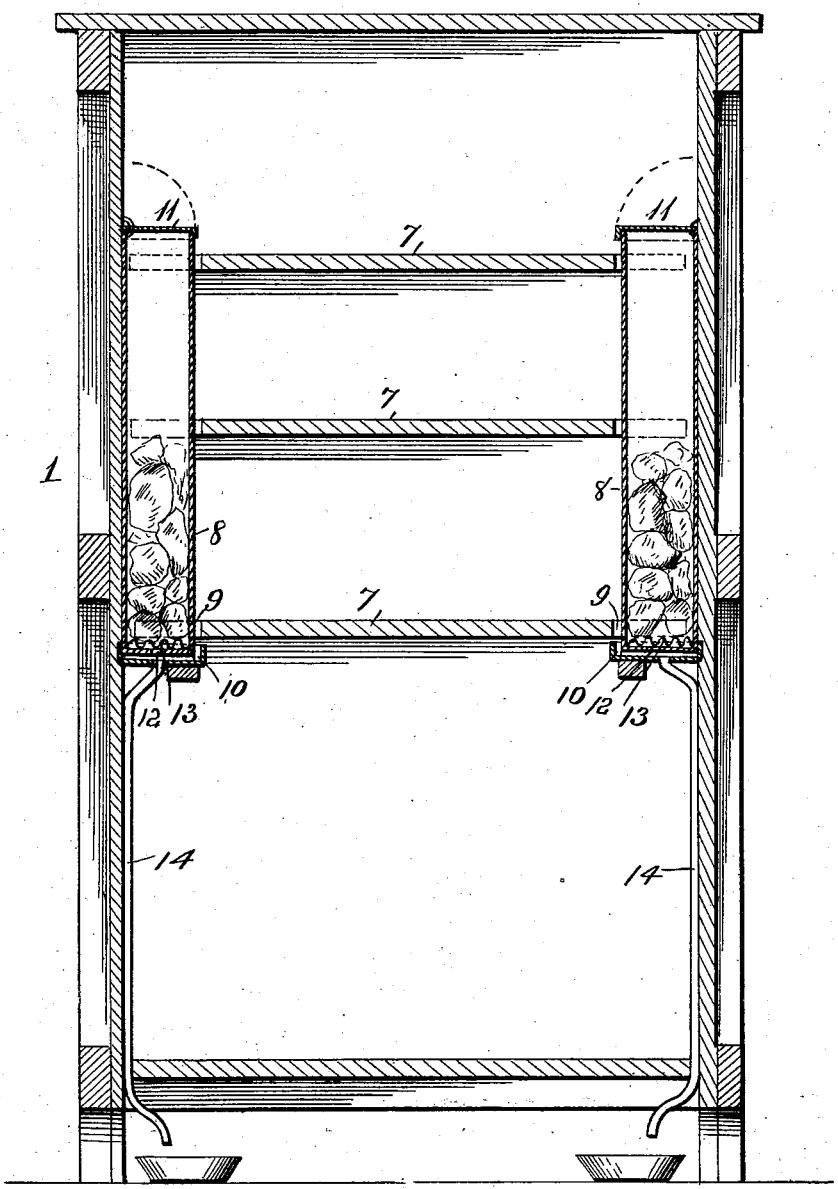

UNITED STATES PATENT OFFICE.

ALEXANDER C. CAMPBELL, OF SANFORD, NORTH CAROLINA.

COMBINED CUPBOARD AND REFRIGERATOR.

SPECIFICATION forming part of Letters Patent No. 724,802, dated April 7, 1903.

Application filed July 12, 1902. Serial No. 115,348. (No model.)

*To all whom it may concern:*

Be it known that I, ALEXANDER C. CAMPBELL, a citizen of the United States, residing at Sanford, in the county of Moore, State of North Carolina, have invented a new and useful Improvement in a Combined Cupboard and Refrigerator; and I do declare the following to be a full, clear, and exact description of the invention, reference being had to the accompanying drawings, which form a part of this specification.

My invention has relation to combined cupboards and refrigerators; and it consists in the novel construction and arrangement of its parts, as hereinafter described.

The object of my invention is to provide a combined cupboard and refrigerator which is adapted to afford ventilation to its contents and at the same time retain the contents at such a low degree of temperature as to preserve the same and keep all food articles in a pure and palatable condition.

In the accompanying drawings, Figure 1 is a front elevation of one form of my invention. Fig. 2 is a transverse sectional view of a form of my invention as shown in Fig. 1. Fig. 3 is a sectional view of the lower portion of an ice-box and tray used in my invention. Fig. 4 is a sectional view of a modified form of my invention.

As shown in Figs. 1 and 2, my combined cupboard and refrigerator consists of a cabinet 1, having the upper doors 2 2, with the perforated panels 3 3, and the lower doors 4, having the perforated panels 5 5 and draw 6, and a number of shelves 7 7, arranged in the upper part of the cabinet. The ice-box 8 is preferably made of metal and is situated in the middle of the cabinet, the said ice-box 8 extending through recesses 9, cut in the rear edges of the shelves 7 7, the top of the ice-box 8 entering the compartment above the upper shelf 7, and the bottom of the ice-box 8 resting in a tray 10, located below the bottom of the upper compartment of the cabinet. The ice-box 8 is provided with a hinged top 11, and the bottom of the ice-box is provided with a drip-port 12, a corrugated metal plate 13 resting upon the bottom of the said ice-box, the ice in turn resting on said plate and being elevated above the moisture caused by meltage. The drip-pipe 14 is connected at its upper end to the tray 10 and runs down behind the draw 6, through the lower compartment of the cabinet 1, and out through the bottom of the same.

By referring to Fig. 2 it will be seen that the shelves 7 do not fit closely about the ice-box 8 and against the back of the cabinet and that the air may be passed from the lower compartment up behind the draw 6 by the tray 10 into the upper compartment of the cabinet and up through the space between the shelves 7 to the ice-box 8 into the upper part of the upper compartment. It will thus be seen that as the air is cooled in the upper compartment it will descend in the inverse order, as above described, into the lower compartment and the warmer air in the lower compartment will ascend into the upper compartment. Thus a continuous circulation of air in the refrigerator is maintained so long as there is ice in the ice-box, the perforation in the panels 3 and 5 admitting sufficient air from the atmosphere to thoroughly ventilate the interior of the cabinet. As the warm air rises and comes in contact with the ice-box 8 condensation takes place, and the water thus condensed runs down the sides of the said ice-box into the tray 10 and then out through the pipe 14.

In the form of the invention as shown in Fig. 4 the same principles are involved and substantially the same constructions used, with the exception that the ice-boxes 8 are duplicated and placed at the ends of the shelves instead of at the center.

Having described my invention, what I claim as new, and desire to secure by Letters Patent, is—

A combined cupboard and refrigerator consisting of a cabinet having upper and lower compartments, a detachable ice-box located in the upper compartment and entering at its lower end the top of the lower compartment, shelves arranged in the upper compartment about said ice-box, the edges of the said shelves being in close proximity to the sides of the ice-box, a tray located in the lower compartment and receiving the lower end of the ice-box, a drip-pipe connecting said tray, and a means for causing air to circulate against the ice-box, whereby as condensation takes place the moisture will follow the sides of the ice-box into the tray and out through the drip-pipe, and simultaneously the cold air from the upper compartment will descend to the lower compartment and the warm air from the lower compartment will ascend to the upper compartment.

In testimony whereof I have hereunto affixed my signature in the presence of two witnesses.

ALEXANDER C. CAMPBELL.

Witnesses:
J. McN. JOHNSON,
CHARLES F. HATCH.